Patented May 10, 1927.

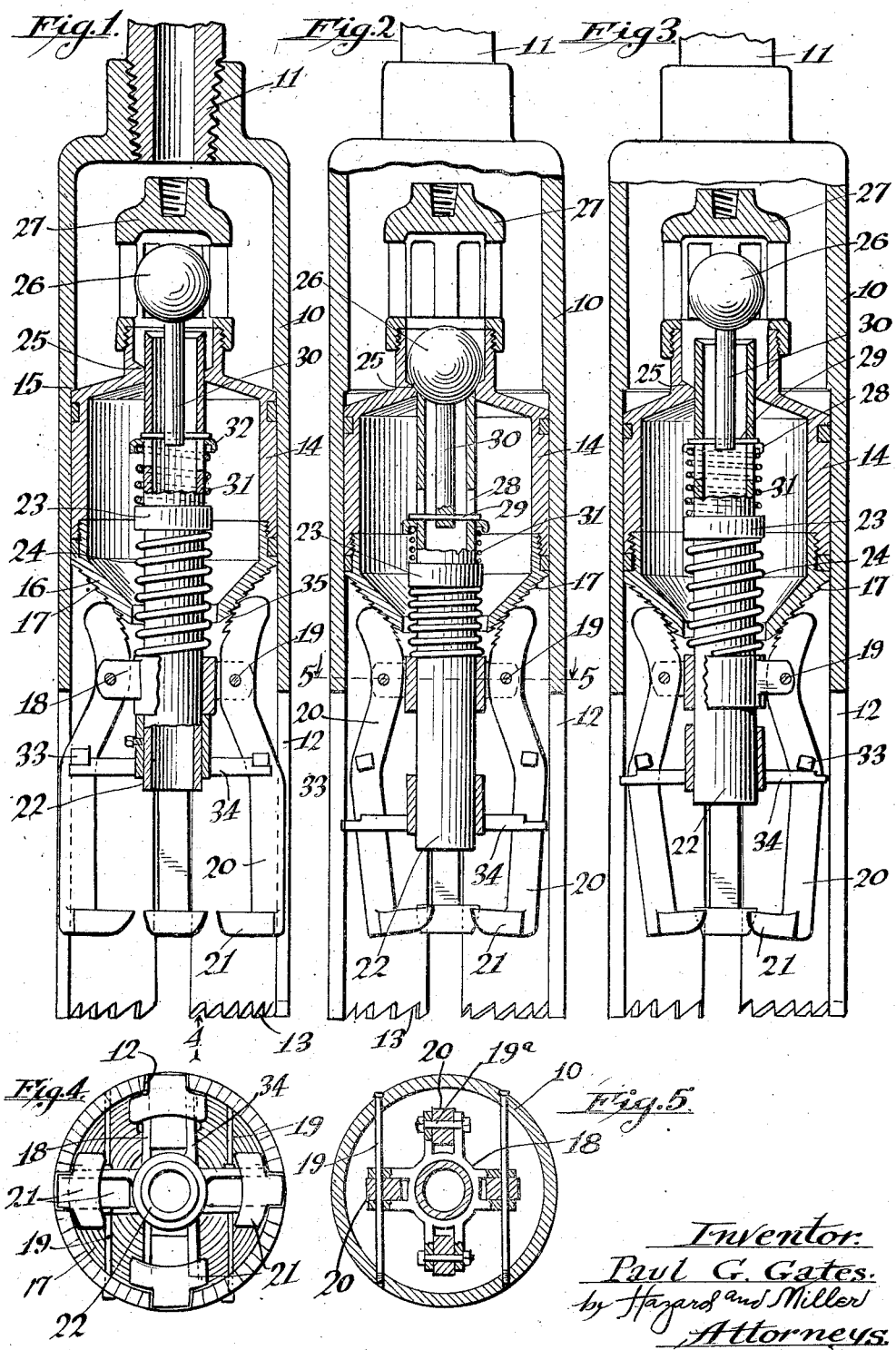

1,628,042

UNITED STATES PATENT OFFICE.

PAUL G. GATES, OF LONG BEACH, CALIFORNIA.

FISHING TOOL.

Application filed March 4, 1926. Serial No. 92,210.

This invention relates to improvements in fishing tools employed in well drilling.

An object of this invention is to provide an improved hydraulically operated fishing tool of that type commonly known as a grab, and which has several advantages over the prior constructions.

Another object of this invention is to provide a fishing tool or grab, in which there is a plurality of fish engaging members pivotally mounted upon the body and a pressure operated piston for causing these members to engage upon a fish, and to provide a construction whereby the fish engaging members may be locked in fish engaging position.

With the foregoing and other objects in view which will be made manifest in the following detailed description and specifically pointed out in the appended claims, reference is had to the accompanying drawings for an illustrative embodiment of the invention, wherein:

Figure 1 is a vertical section through the improved fishing tool illustrating the fish engaging members in expanded position, Fig. 2 is a view similar to Fig. 1 illustrating the fish engaging members in contracted or fish engaging position, Fig. 3 is a view similar to Fig. 1 illustrating the position of the device after the fish has been engaged or the fish engaging members have been locked in their fish engaging position, Fig. 4 is a bottom plan view of the tool shown in Fig. 1, and Fig. 5 is a horizontal section taken on the line 5—5 of Fig. 2.

Referring to the accompanying drawings wherein similar reference characters designate similar parts throughout, the improved fishing tool consists of a hollow cylindrical body 10 having its upper end reduced and internally threaded, as indicated at 11, for attachment to a lowering string of drill pipe. In the body adjacent its lower end there is formed a plurality of vertical slots 12, which in the present instance are four in number arranged 90 deg. apart. The lower edge of the body is preferably toothed, as indicated at 13, for a purpose hereinafter to be described.

Within the body 10 there is disposed a hollow piston 14 which is slidable therein and which has its upward movement limited by means of a shoulder 15. The lower end of the piston is conical in form, as indicated at 16, so as to form a wedge, and on the exterior of the conical portion 16 there are formed teeth 17. A spider 18 is disposed within the body below the piston and has each of its arms bifurcated. Bolts 19 extend through the body 10 and through the ends of two arms on the spider 18, and serve to support the spider within the body. A plurality of fish engaging members 20 are positioned in the bifurcated arms of the spider 18 and the bolts 19 extend through two of these fish engaging members intermediate their ends so as to pivotally mount the fish engaging members upon the body. Bolts 19$^a$ pass through the other two fish engaging members intermediate their ends and through the other two bifurcated arms of the spider 18. The lower ends of the fish engaging members are adapted to swing into the slots 12, when the tool is in the position shown in Fig. 1, and at the lower extremities of the fish engaging members there are provided inwardly extending feet 21.

A pipe 22 slidably extends through the spider 18 and has a shoulder 23 thereon providing a spring seat for a coil spring 24 which is compressed between the shoulder 23 and the spider 18. The upper end of the pipe 22 slidably extends through the top of the piston 14 which is provided with a nipple 25. A ball check valve 26 is adapted to seat upon the upper end of the pipe and is also capable of seating in the nipple 25. This ball check valve has its movement limited or confined by means of a cage 27 mounted on the nipple 25. In the pipe 22 above the shoulder 23 there are formed slots 28 in which the ends of a pin 29 are slidable. The pin 29 carries an upstanding rod 30 which is adapted to engage upon the under side of the ball check valve 26 so as to maintain the ball off of the seat on the upper end of the pipe 22 within the nipple 25. The rod or pin 30 is maintained or urged into such position by means of a coil spring 31 disposed between the shoulder 23 and a spring seat 32, slidable on the pipe 22 immediately below the pin 29. On one side of each of the fish engaging members 20 there is formed a lug 33, and the lower end of the pipe 22 has a spider 34, the arms of which are slightly rebated so as to receive the lugs 33. Because of the arrangement of the arms of the spider 34, rotation of the spider and of the pipe 22 relatively to the fish engaging members and spider 18 is prevented, as shown in Fig. 4. The upper ends of each of the fish engaging members 20 are toothed, as indicated at 35, so as to have teeth complementary to the teeth 17 on the wedge or conical portion 16.

The operation of the tool is as follows: Before the device is lowered into a well, the fish engaging members are caused to assume the position shown in Fig. 1 with the spider 34 having its arms in engagement with the lugs 33 so as to prevent the contraction of the fish engaging members. The pipe 22 is maintained in elevated position to cause the arms of the spider 34 to engage the lugs 33 by means of the coil spring 24. In such position it will be noted that the upper end of the pipe projects upwardly a short distance above the seat within the nipple 25, and the rod 30 keeps the ball check valve 26 off of the seat on the upper end of the pipe. The tool is then lowered into the well while in such position, and when it reaches the approximate location of the fish, the drill pipe may be rotated so as to rotate the body pipe 10 and thus cause the teeth 13 to cut about the fish which may have become stuck or imbedded in the mud. During such cutting, circulation fluid may flow downwardly through the drill pipe and through the pipe 22. After this has been done, a considerable pressure is supplied within the drill pipe which serves first to tend to cause the ball check valve 26 to seat upon the upper end of the pipe 22, forcing the rod 30 downwardly and compressing the coil spring 31. The downward movement of the pipe 22 within the piston 14 causes the arms of the spider 34 to disengage the lugs 33, permitting the fish engaging members 20 to contract. It also enables the ball check valve 26 to seat within the nipple 25, and as the fish engaging members are no longer locked in expanded position, the fluid pressure can now force the piston downwardly within the body 10. This causes the wedge 16 to separate the upper ends of the fish engaging members 20, causing their lower ends to be contracted into fish engaging position and grab upon a fish. They are locked in such position by the interengagement between the teeth 17 and 35. When the fish has been engaged, the pressure within the drill pipe is relieved, and this will permit the rod 30 to rise and thus unseat the ball 26 from the pipe 22. The drill pipe, fishing tool and fish can then be withdrawn from the well and fluid within the drill pipe can flow out of it during the withdrawal of the drill pipe through the pipe 22 which is now open. When the tool has been withdrawn from the well, it can be removed from between the seat 21 by removing the bolts 19, which, as clearly shown in Fig. 4, have their heads located upon the exterior of the body so as to be readily accessible. This serves to loosen the fish engaging members and permit the teeth 35 to be disengaged from the teeth 17.

From the above described construction it will be readily appreciated that the improved fishing tool is hydraulically operated, and that it permits circulation fluid to pass through the tool before and after the fish is engaged. Furthermore, the pressure of the circulation fluid is employed to cause the fish engaging members to engage upon the fish, and means is provided for locking them in engaged position.

It will be understood that various changes may be made in the detail of construction without departing from the spirit or scope of the invention as defined by the appended claims.

I claim:

1. A fishing tool comprising a body, fish engaging members pivotally mounted upon said body, and hydraulically operated means for causing the fish engaging members to swing into fish engaging position.

2. A fishing tool comprising a body, fish engaging members pivotally mounted upon said body, hydraulically operated means for causing the fish engaging members to swing into fish engaging position, and means for locking said members in fish engaging position.

3. A fishing tool comprising a body, fish engaging members pivotally mounted intermediate their ends upon said body, a piston movable in said body, means for supplying fluid pressure to the body on top of the piston to force the piston downwardly therein, and a wedge carried by the piston adapted to be forced by the piston between the upper ends of said fish engaging members so as to cause their lower ends to swing into fish engaging position.

4. A fishing tool comprising a body, fish engaging members pivotally mounted intermediate their ends upon said body, a piston movable in said body, means to supply a pressure fluid, a wedge carried by the piston adapted to be forced by the piston between the upper ends of said fish engaging members when fluid pressure is applied to the piston so as to cause their lower ends to swing into fish engaging position, and means for locking the fish engaging members in fish engaging position.

5. A fishing tool comprising a hollow body, a piston disposed therein, a wedge provided upon the lower end of the piston, a pipe slidably extending through said piston and wedge, a spider mounted upon the lower end of the pipe, a check valve adapted to close said pipe against downward flow therethrough, a plurality of fish engaging members pivotally mounted intermediate their ends upon said body, and means whereby said spider may hold the fish engaging members in expanded position, whereby upon applying pressure within said body, said pipe may be forced downwardly to release the fish engaging members, permitting the piston to force the wedge between the upper ends of the fish engaging members, causing their lower ends to contract into fish engaging position.

6. A fishing tool comprising a hollow body, a piston disposed therein, a wedge provided upon the lower end of the piston, a pipe slidably extending through said piston and wedge, a spider mounted upon the lower end of the pipe, a check valve adapted to close said pipe against downward flow therethrough, a plurality of fish engaging members pivotally mounted intermediate their ends upon said body, and means whereby said spider may hold the fish engaging members in expanded position, whereby upon applying pressure within said body, said pipe may be forced downwardly to release the fish engaging members, permitting the piston to force the wedge between the upper ends of the fish engaging members, causing their lower ends to contract into fish engaging position, there being teeth formed upon the wedge and upon the upper ends of said fish engaging members adapted to engage and lock the fish engaging members in contracted position.

7. A fishing tool including a hollow body, a piston movable therein, means for supplying fluid pressure to the body to actuate the piston, fish engaging members operable by the piston, there being a passage through the piston, means operable by increasing the fluid pressure beyond a predetermined degree to close the passage so that the piston may be moved by the fluid, and means operable to open the passage when the pressure falls below a predetermined degree.

8. A fishing tool comprising a cylindrical body having cutting teeth upon its bottom, fish engaging members pivotally mounted within the body, hydraulically operable means for causing said fish engaging members to engage upon a fish, and means for supplying fluid pressure to the body to operate said hydraulically operated means.

9. A fishing tool comprising a cylindrical body having cutting teeth upon its bottom, fish engaging members pivotally mounted within the body, hydraulically operable means for causing said fish engaging members to engage upon a fish, means for supplying fluid pressure to the body to operate said hydraulically operated means, and means for locking the fish engaging members in fish engaging position.

In testimony whereof I have signed my name to this specification.

PAUL G. GATES.